United States Patent
Chandra et al.

(10) Patent No.: US 10,552,234 B2
(45) Date of Patent: Feb. 4, 2020

(54) ENHANCED NOTIFICATION OF EDITING EVENTS IN SHARED DOCUMENTS

(71) Applicant: Microsoft Technology Licensing, LLC, Redmond, WA (US)

(72) Inventors: Omeed Chandra, Seattle, WA (US); Ginger Elizabeth Fang, Bellevue, WA (US); Sanyam Sharma, Redmond, WA (US); Daniel Robert Amirault, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/964,978

(22) Filed: Dec. 10, 2015

(65) Prior Publication Data

US 2017/0168878 A1   Jun. 15, 2017

(51) Int. Cl.
*G06F 3/00* (2006.01)
*G06F 9/54* (2006.01)
*G06F 17/24* (2006.01)

(52) U.S. Cl.
CPC .............. *G06F 9/542* (2013.01); *G06F 17/24* (2013.01)

(58) Field of Classification Search
CPC ........................................................ G06F 9/542
USPC ........................................................ 719/318
See application file for complete search history.

(56) References Cited

U.S. PATENT DOCUMENTS

| | | | |
|---|---|---|---|
| 5,721,825 A | 2/1998 | Lawson et al. | |
| 7,821,405 B2 | 10/2010 | Heidloff et al. | |
| 8,065,365 B2 | 11/2011 | Saxena et al. | |
| 8,145,742 B1 | 3/2012 | Parker et al. | |
| 8,775,963 B2 | 7/2014 | Mujkic | |
| 9,319,369 B2* | 4/2016 | Faaborg | H04L 51/24 |
| 2002/0087649 A1* | 7/2002 | Horvitz | G06Q 10/107 709/207 |
| 2004/0010522 A1 | 1/2004 | Shulok | |
| 2006/0268320 A1* | 11/2006 | Bridges | G06F 3/1222 358/1.15 |
| 2007/0083569 A1* | 4/2007 | Wong | G06F 17/30371 |
| 2010/0013634 A1* | 1/2010 | Kanna | G05B 23/0272 340/540 |

(Continued)

FOREIGN PATENT DOCUMENTS

WO      2014163605 A1   10/2014

OTHER PUBLICATIONS

Vom, Visibility in Event-Based Systems (Year: 2005).*

(Continued)

*Primary Examiner* — Lechi Truong

(57) ABSTRACT

Technology is disclosed herein that enhances collaboration notifications. In various implementations, a notification queue is maintained for internal notifications that are generated as editing events that occur in relation to a shared document. The notification queue is periodically queried to determine which of the notifications qualify at a given time to be communicated externally to a group of users. An individual notification is communicated when only a single internal notification qualifies. But when multiple internal notifications are present that qualify, then a group notification is sent. Thus, users are presented with fewer notifications than otherwise, improving the user experience and conserving communication and computing resources.

18 Claims, 16 Drawing Sheets

(56) References Cited

U.S. PATENT DOCUMENTS

| | | | |
|---|---|---|---|
| 2011/0060996 A1 | 3/2011 | Alberth, Jr. et al. | |
| 2011/0314064 A1 | 12/2011 | Jeyaseelan et al. | |
| 2012/0026542 A1* | 2/2012 | Kobayashi | G06F 3/1206 358/1.15 |
| 2012/0120441 A1* | 5/2012 | Kaneko | H04L 41/069 358/1.15 |
| 2012/0150971 A1 | 6/2012 | Bahrainwala et al. | |
| 2013/0325922 A1 | 12/2013 | Chaudhri et al. | |
| 2014/0082093 A1* | 3/2014 | Savage | H04L 12/2417 709/206 |
| 2018/0109648 A1* | 4/2018 | Matsumoto | H04L 67/325 |

OTHER PUBLICATIONS

"CollateBox", Published on: Apr. 4, 2013 Available at: collatebox.com/web/tour.html.

"Working with Shared Office Documents", Retrieved on: Oct. 16, 2015 Available at: https://docs.jivesoftware.com/jivecloud/community_user/index.jsp?topic=/com.jivesoftware.help.jiveforoffice.online/JiveforOffice/WorkingwithJiveforOffice.html.

Matthew, "User Guide to Dropbox Shared Folders", Published on: Jun. 5, 2010 Available at: howtogeek.com/howto/16310/user-guide-to-dropbox-shared-folders/.

Tlaforestrie, "Email Notification of Changes to Document", Published on: Dec. 1, 2009 Available at: https://productforums.google.com/forum/#!topic/docs/mR-UpfGZu_l.

Lonsdale, Brett, "Modify Alert Notifications using AlertTemplates.xml in SharePoint 2007", Published on: Dec. 11, 2009 Available at: combined-knowledge.com/Downloads/2007/Modify_Alert_Notifications.pdf.

"Configure Alert Notification Throttling", Retrieved on: Oct. 16, 2015 Available at: https://pubs.vmware.com/vfabric5/index.jsp?topic=/com.vmware.vfabric.hyperic.4.6/Configure_Alert_Notification_Throttling.html.

Sundaram, Shunmugha, "How-To: Get Email Alerts When Any Google Document is Updated", Published on: Nov. 4, 2014 Available at: http://techawakening.org/get-notification-when-any-google-document-edited/3055/.

"International Search Report and Written Opinion Issued in PCT Application No. PCT/US2016/063750", dated Feb. 6, 2017, 11 Pages.

"Second Written Opinion Issued in PCT Application No. PCT/US2016/063750", dated Oct. 13, 2017, 4 Pages.

"International Preliminary Report on Patentability Issued in PCT Application No. PCT/US2016/063750", dated Feb. 26, 2018, 8 Pages.

* cited by examiner

600

[Time of Query = 6:55]

| notification | description | time |
|---|---|---|
| n_x | fuerit duodecim | 6:30 |
| ... | ... | ... |
| n1 | editing page m | 6:48 |
| n2 | editing page n | 6:52 |
| n3 | editing page k | 6:54 |
| n4 | editing page m | 6:57 |
| n5 | editing page j | 7:02 |
| n6 | editing page n | 7:04 |
| ... | ... | ... |
| N_x+6 | cogitare de illa | |

[Time of Query = 7:00]

239

| notification | description | time |
|---|---|---|
| n_x | fuerit duodecim | 6:30 |
| ... | ... | ... |
| n1 | editing page m | 6:48 |
| n2 | editing page n | 6:52 |
| n3 | editing page k | 6:54 |
| n4 | editing page m | 6:57 |
| n5 | editing page j | 7:02 |
| n6 | editing page n | 7:04 |
| ... | ... | ... |
| N_x+6 | cogitare de illa | |

FIGURE 7

[Time of Query = 7:05]

| notification | description | time |
|---|---|---|
| n$_x$ | fuerit duodecim | 6:30 |
| ... | ... | ... |
| n1 | editing page m | 6:48 |
| n2 | editing page n | 6:52 |
| n3 | editing page k | 6:54 |
| n4 | editing page m | 6:57 |
| n5 | editing page j | 7:02 |
| n6 | editing page n | 7:04 |
| ... | ... | ... |
| N$_{x+6}$ | cogitare de illa | |

*[Time of Query = 7:10]*

239

| notification | description | time |
|---|---|---|
| n_x | fuerit duodecim | 6:30 |
| ... | ... | ... |
| n1 | editing page m | 6:48 |
| n2 | editing page n | 6:52 |
| n3 | editing page k | 6:54 |
| n4 | editing page m | 6:57 |
| n5 | editing page j | 7:02 |
| n6 | editing page n | 7:04 |
| ... | ... | ... |
| N_x+6 | cogitare de illa | |

FIGURE 9

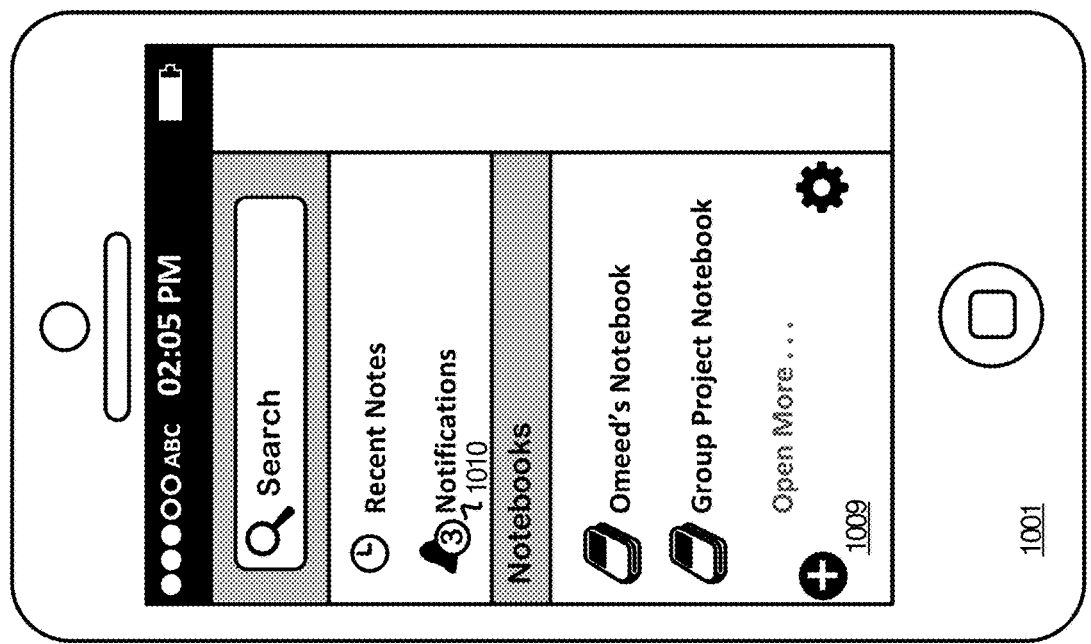

ENHANCED NOTIFICATION OF EDITING EVENTS IN SHARED DOCUMENTS

TECHNICAL BACKGROUND

Collaboration has become increasingly popular among groups of users working on documents. Many productivity applications support collaboration where users can simultaneously open, read, and edit a document, such as word processing documents, spreadsheet workbooks, and presentations.

While word processing applications are perhaps the most common type of application for such collaboration, note taking applications are another type of productivity application that have gained prominence. Note taking applications are typically modeled after physical notebooks, with pages, sections, and other analogs. Users can take notes in the applications in the form of hand-written notes, typed text, web pages or page excerpts, photographs, voice memos, or even video recordings.

Some productivity applications support notifications to notify users when an editing event has occurred in a shared document. In an example, one user may make a change to a list that is being kept in a digital notebook. The other users associated with the digital notebook can be sent a notification that surfaces in the user interface to their application or in their lock screen, for example.

Notifications can be helpful, especially when they are delivered in a timely fashion. However, too many notifications can be come annoying or even counter-productive. From a more technical perspective, collaboration notifications consume bandwidth, power, and other computing resources that might otherwise be conserved or put to other workloads.

OVERVIEW

Notification technology is disclosed herein that enhances document collaboration. In various implementations, a notification queue is maintained for internal notifications that are generated as editing events that occur in relation to a shared document. The notification queue is periodically queried to determine which of the notifications qualify at a given time to be communicated externally to a group of users. An individual notification is communicated when only a single internal notification qualifies. But when multiple internal notifications are present that qualify, then a group notification is sent. Thus, users are presented with fewer notifications than otherwise, improving the user experience and conserving communication and computing resources.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 6 illustrates another view of the notification queue.

FIG. 7 illustrates another view of the notification queue.

FIG. 8 illustrates another view of the notification queue.

FIG. 9 illustrates another view of the notification queue.

FIGS. 10A-10D illustrate a progression of views in an implementation of enhanced collaboration notification.

TECHNICAL DISCLOSURE

Technology is disclosed herein for enhancing how end-users in collaborative situations are notified when another user (or users) edits a shared document. Briefly, a notification service is disclosed that periodically examines a notification queue for the presence of one or more internal notifications. The internal notifications relate to editing events that may occur with respect to a document shared by a group of users.

When only a single internal notification is present, the notification service generates and sends a single external notification to the users. But when multiple internal notifications are present that are pending action, the notification service groups the internal notifications into a single external notification (referred to as a group notification) and sends the group notification to the users.

In some scenarios, the individual notification may describe an editing event with specificity, whereas a group notification may describe multiple editing events in general. For example, an internal notification related to a user's edit of a page might describe what page was edited and by whom. In contrast, a group notification might express in general that multiple edits occurred with respect to a page, a section, a chapter, or an entire notebook, without referring with specificity to any given one of the edits. This may apply as well to other types of productivity items, such as word processing documents and spreadsheets and the various delimiting characteristics of those types of items. The notifications may be communicated by the notification service to end-user clients via push notifications, email, text messages, or any other communication channel.

Communicating a group notification may achieve the technical effect of conserving bandwidth as sending one notification utilizes less capacity than sending multiple notifications. In addition, local power may be conserved as surfacing one group notification utilizes less capacity than surfacing several.

The user experience may also be improved. In collaborative group scenarios, the volume and frequency of edits may be such that, were individual notifications to be sent for all of them, the end-users would be inundated with notifications. By grouping notifications, the end-users are spared the sub-optimal experience of too many notifications.

Figure 1A:
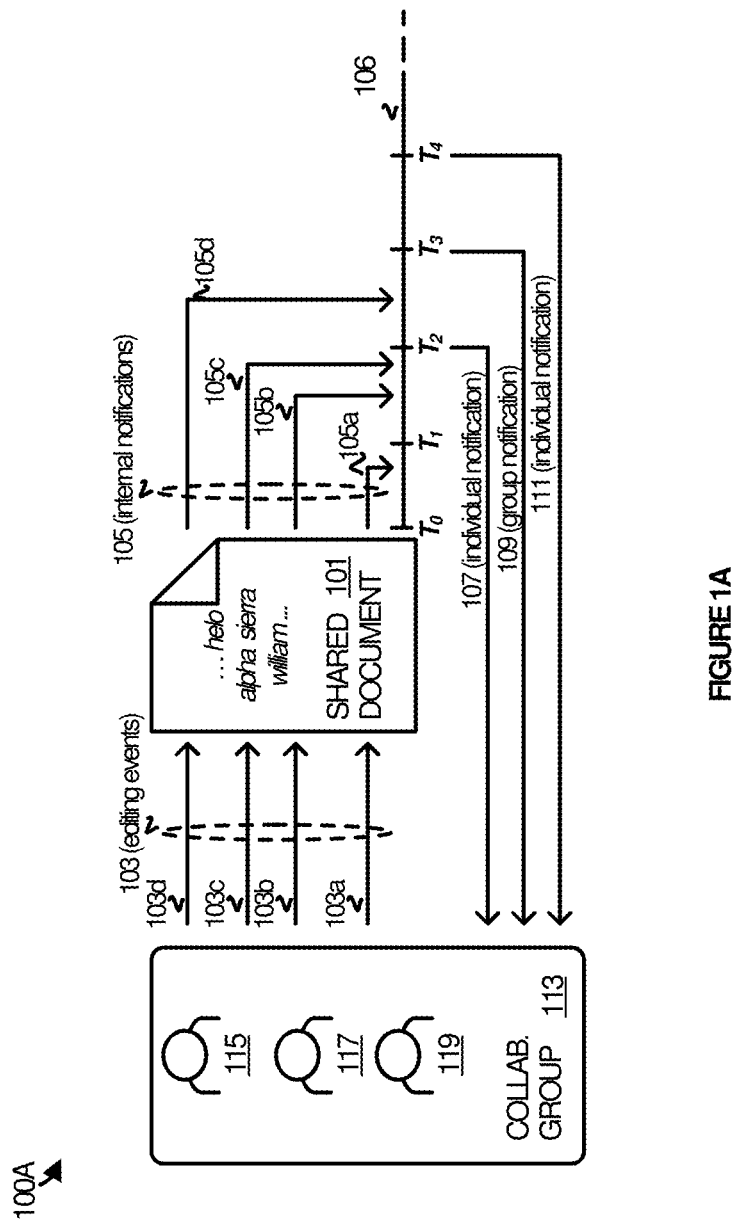
FIGS. 1A-1C illustrate various operational scenarios in implementations of enhanced collaboration notification.

FIG. 1A illustrates an operational scenario 100A in an implementation of enhanced notification technology. Operational scenario 100A involves a shared document 101 which is associated with a collaboration group 113. The collaboration group 113 includes various users, represented by user 115, user 117, and user 119. The users in collaboration group 113 are associated with shared document 101 such that they may open, read, and edit shared document 101 in a collaborative or shared manner. Examples of shared document 101 include word processing documents, spreadsheets, presentations, and digital notebooks, as well as any other document format capable of being shared.

In operation, editing events 103 occur with respect to shared document 101. Any of the editing events 103 may be precipitated by any of the users in collaboration group 113 interfacing with a software application on a suitable computing device.

The editing events may be interspersed in time with respect to each other, as may happen whenever a group of users share a document. One or more of the users may be adding text to one section, for example, while later on another user deletes text from that section. Or, the same user may edit a section continuously over a relatively long period of time. Any number of editing scenarios are possible and are within the scope of the present disclosure.

As the editing events occur, internal notifications (105) are generated that reflect what changes were made with respect to shared document 101 in the course of the editing events. The internal notifications are stored in a queue in the order in which they occurred. The notifications may be time-stamped or otherwise cataloged for later analysis. Timeline 106 illustrates when the internal notifications 105 are logged relative to each other and/or when the editing events 103 occurred relative to each other.

Rather than generate an external notification for every internal notification that is logged in the queue, the notifications are analyzed for whether or not they can be grouped together in one external notification. The analysis occurs on a periodic basis, looking back at a previous time period's notification activity to determine whether or not multiple notifications even occurred that can be grouped into a single external notification.

In operational scenario 100A, editing events 103 include various events that occur in a non-periodic sequence for illustrative purposes, represented by event 103a, event 103b, event 103c, and event 103d. As each event occurs, a corresponding internal notification is generated and is registered in the queue. Event 103a results in internal notification 105a; event 103b results in internal notification 105b; event 103c results in internal notification 105c; and event 103d results in internal notification 105d.

As the events are occurring, a determination is made periodically whether or not any notifications are present in the queue such that either an individual notification (in the case of a single internal notification) or a group notification (in the case of multiple internal notifications) may be sent to one or more of the users in collaboration group 113.

In this example, an individual notification 107 is sent at time T2 because only a single internal notification was present during the period prior to the period ending at T2. That is, the period lasting from T0 until T1 experienced the occurrence of only one editing event (event 103a) and thus the presence of only a single internal notification (internal notification 105a). Accordingly, the individual notification 107 is sent.

In contrast, at time T3 a group notification 109 is sent to one or more of the users in collaboration group 113. This is because during the period ranging from T1 until T2, multiple internal notifications were present in the queue (internal notification 105b and internal notification 105c). A savings in communication bandwidth is thus achieved as only one notification need be sent to the users, rather than two (or more, in the case of many internal notifications). In addition, resources are saved locally with respect to the applications and devices operated by the users in collaboration group 113, as only one group notification need be surfaced, rather than multiple individual notifications.

Then, at time T4 an individual notification 111 is again sent. This is because during time T2 and time T3 only a single internal notification was logged in the queue.

In some scenarios, individual notifications may be sent in addition to group notifications. For example, a group notification may be sent when multiple internal notifications occur in a time period so that the group notification can be surfaced to a user without bothering the user with multiple individual notifications. However, the individual notifications may still be communicated to the end-user so that they can be accessed and viewed if so desired by the end-user.

Figure 1B:
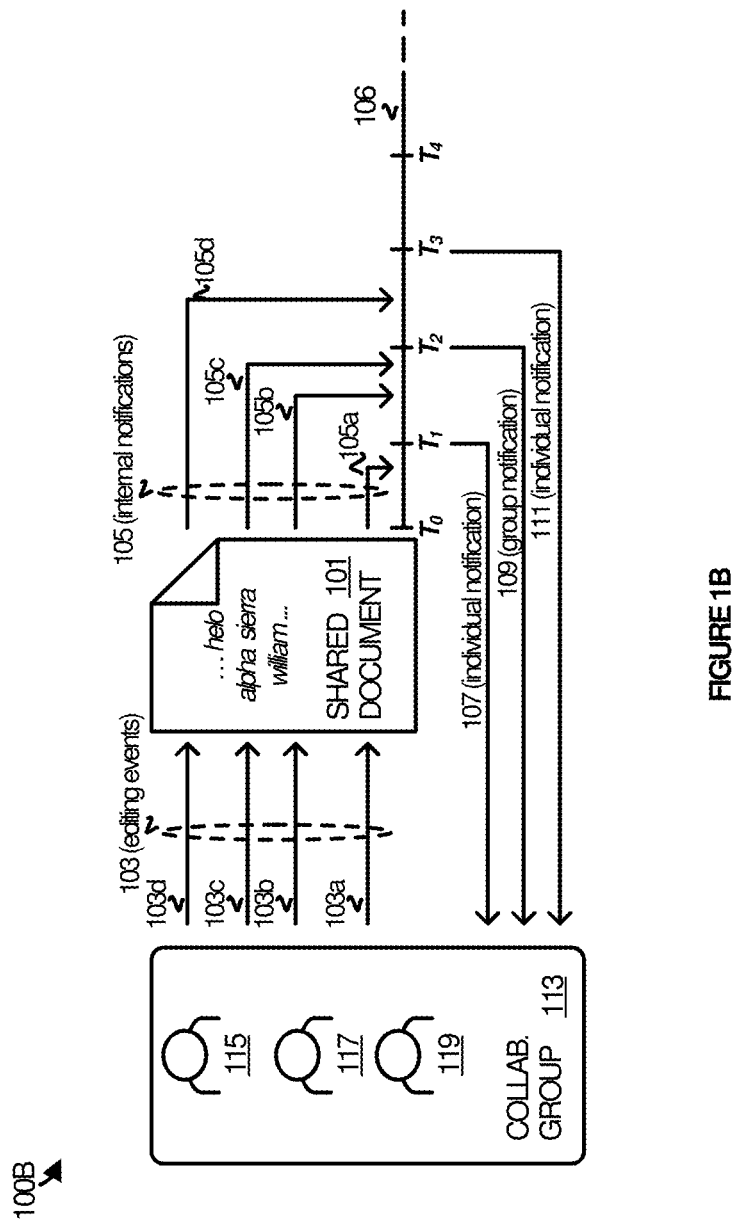

FIG. 1B illustrates operational scenario 100B in an implementation that represents a slight modification relative to operational scenario 100A. In operational scenario 100B, there is no delay between when the analysis of any notifications in the queue is commenced relative to the period of time being analyzed. For instance, individual notification 107 is generated and sent at time T1, whereas in operational scenario 100A, the process commenced at time T2. Similarly, group notification 109 is sent at time T2 and individual notification 111 is sent at time T3.

The results illustrated in operational scenario 100B are the same as those in operational scenario 100A, although the results could vary depending upon the actual timing of the internal notifications and when the queue analysis is commenced.

Figure 1C:
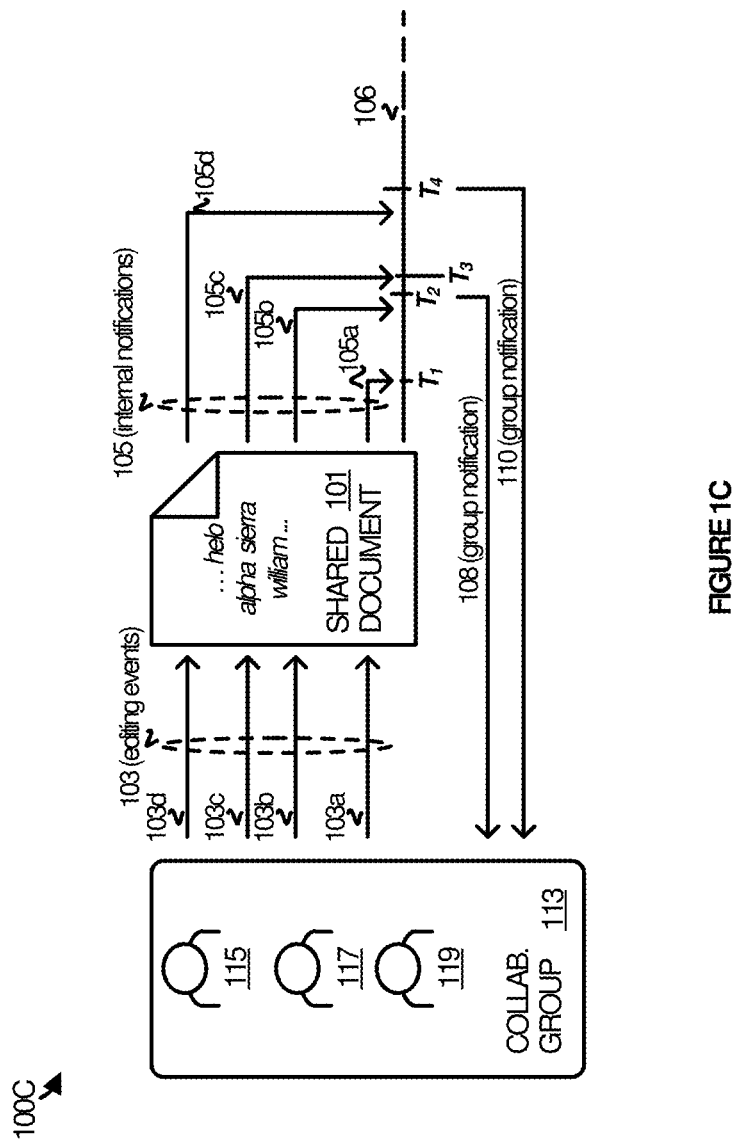

FIG. 1C illustrates another scenario, operational scenario 100C, to illustrate another alternative way to handle notifications. In operational scenario 100C, a waiting period is commenced with each new notification that is entered in the queue. At the end of the waiting period, a determination is made whether or not any additional internal notifications were entered in the queue. If so, then a group notification is sent. If not, then an individual notification is sent.

In this example situation, a first waiting period begins at time T1 when internal notification 105a is logged. The waiting period extends until time T2, during which internal notification 105b is logged. Therefore, looking back through the waiting period, internal notification 105a and internal notification 105b can be grouped into a single group notification, represented by group notification 108.

After the first waiting period, a new waiting period is not commenced until another new notification is freshly logged in the queue. Internal notification 105c triggers the new waiting period which extends from time T3 until time T4. During that period, internal notification 105c and 105d are received. Accordingly, group notification 110 is generated and sent to the users in collaboration group 113.

Figure 2:
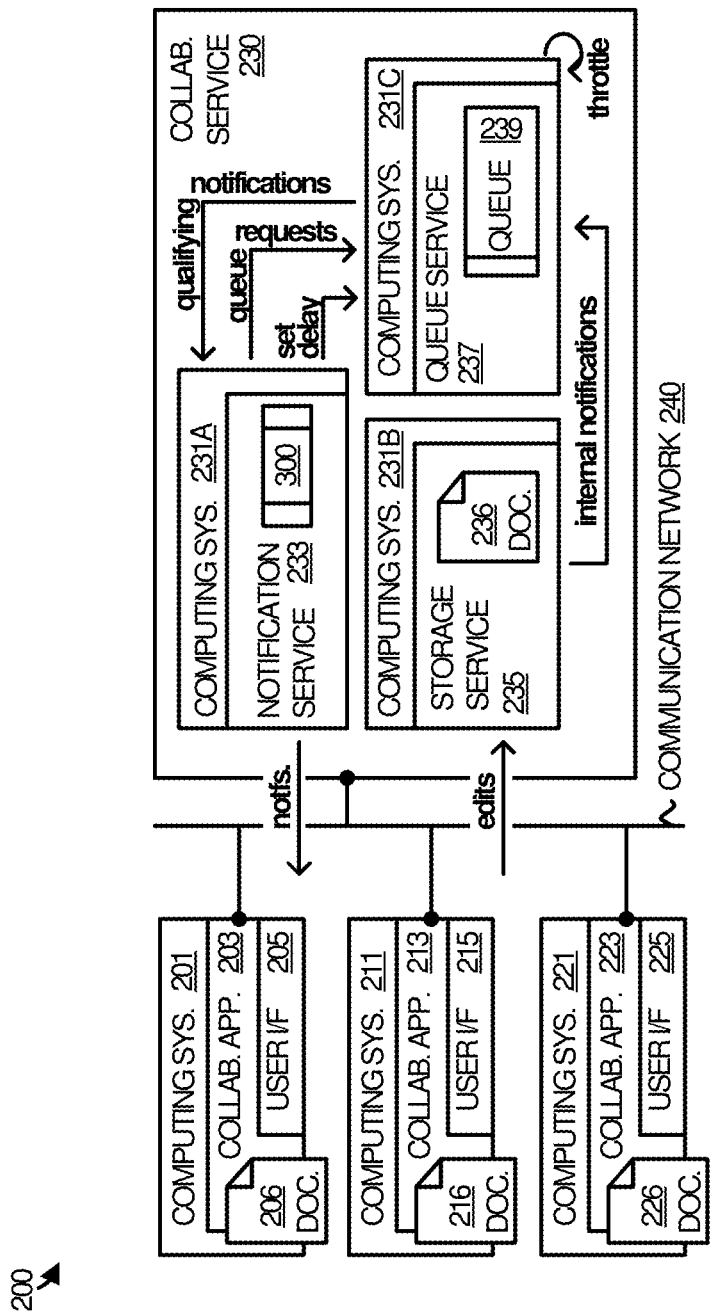
FIG. 2 illustrates an operational architecture in an implementation.

FIG. 2 illustrates an operational architecture 200 in an implementation. Operational architecture 200 includes computing system 201, computing system 211, and computing system 221, which employ collaboration application 203, collaboration application 213, and collaboration application 223 respectively.

Figure 11:
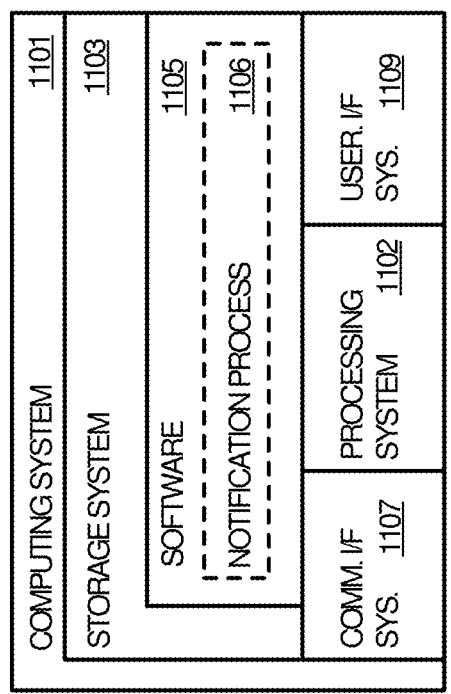
FIG. 11 illustrates a computing system suitable for implementing any of the architectures, processes, view, and operational scenarios and sequences disclosed herein with respect to the Figures and discussed below in the Technical Disclosure.

Examples of computing systems 201, 211, and 221 include, but are not limited to, mobile phones, tablet computers, laptop computer, desktop computers, wearable devices, smart televisions, gaming devices, and any other type of computing device, of which computing system 1101 in FIG. 11 is representative. Examples of collaboration applications 203, 213, and 223 include, but are not limited to, digital notebook applications, word processing applications, spreadsheet applications, presentation applications, blogging and micro-blogging applications, as well as any other type of application that supports collaboration with respect to a shared document or other such content.

Each of the collaboration applications 203, 213, and 223 provide users with a user interface to a shared document that the users may open, read, edit, or interact with any other manner Document 206, document 216, and document 226 are each representative of an instance of the shared document that may be opened by any of the collaboration applications.

Collaboration service 230 includes a computing system 231A that hosts a notification service 233, a computing system 231B that hosts storage service 235, and a computing system 231C that hosts queue service 237. Storage service 235 hosts document 236, which represents the authoritative version of the shared document rendered externally as document 206, document 216, and document 226. Computing system 1101 in FIG. 11 is representative of a computing system or systems (physical and/or virtual) suitable for implementing computing system 231A, 231B, and 231C, as well as notification service 233, storage service 235, and queue service 237.

In operation, the collaboration applications 203, 213, and 223 render user interfaces via which users may interact with shared documents. When edits are made to any one or more of document 206, document 216, and document 226, the edits are communicated by the relevant collaboration application to storage service 235 to be persisted in document 236. Storage service 235 generates internal notifications that are descriptive of the edits and communicates the internal notifications to queue service 237.

Queue service 237 responsively logs the internal notifications in queue 239. Queue service 237 is representative of a service that provides queues for handling messaging between application services. Queue 239 is representative of a notification queue that is made available to other services so that they can have insight into the operations of storage service 235.

Notification service 233 is one such services that is capable of leveraging queue 239. Notification service 233 requests information from queue 239 and receives qualifying notifications in response. Queue service 237 throttles queue 239 so that not all the pending notifications in queue 239 that qualify for/are available to notification service 233 based on a delay set by notification service 233.

Figure 3:
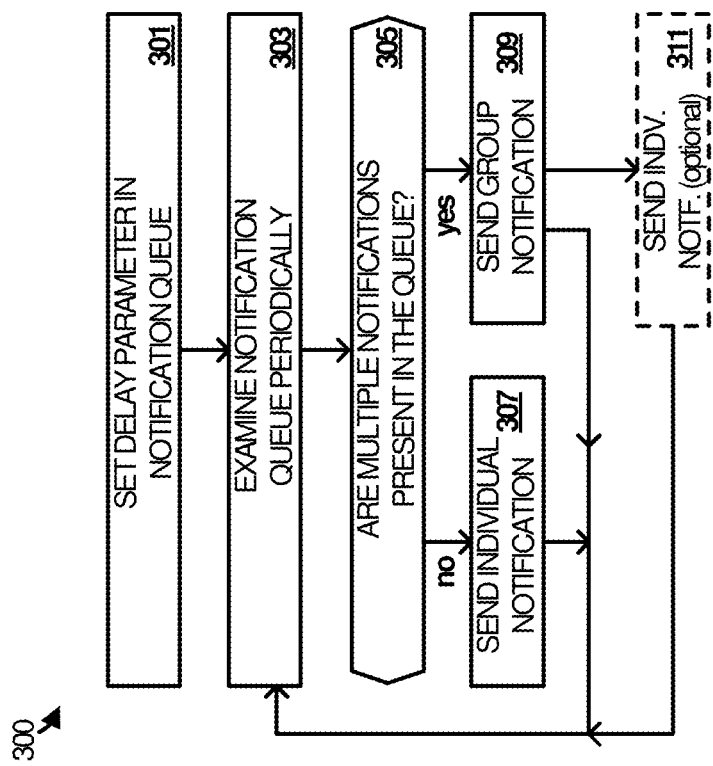
FIG. 3 illustrates a notification process in an implementation.

Notification process 300, illustrated in detail in FIG. 3, is representative of a process employed by notification service 233 in order to obtain and process information from the queue 239. Notification process 300 may be implemented as a program module(s), component(s), application(s), or other such collection of program instructions executed by computing system 231A in the context of notification service 233. Referring parenthetically to the steps illustrated in FIG. 3, the following discussion highlights at least some of the functionality performed by notification service 233 when employing notification service 300.

In operation, notification service 233 sets a delay parameter in notification queue that guides how much of a delay there will be between when an internal notification is logged and when it is considered for handling as an external notification (step 301). In general, the larger the delay parameter, the greater the likelihood that multiple notifications are present in a queue that qualify for grouping in a group notification. The smaller the delay parameter, the less likely that multiple notifications are present, thereby increasing the likelihood that a single external notification results from any given internal notification. The delay parameter is communicated to queue service 237 and affects how much of the queue 239 is available to notification service 233 for examination.

Notification service 233 examines the queue 239 periodically (step 303). This may involve querying queue service 237 for at least some or all of the contents of queue 239. Optionally, queue service 237 may publish some or all of the contents of queue 239 to notification service 233 automatically. In other words, either a push, poll, or pull mechanism may be utilized to convey information from queue 239 to notification service 233.

How much of the queue is provided to notification service 233 depends on the delay parameter set at step 301. For example, if the delay parameter is set to 5 minutes, then any internal notifications received within the last 5 minutes prior to a query are hidden from notification service 233; if the delay period is set to 10 minutes, than any internal notifications arriving in the last 10 minutes are hidden; if 1 minute, then notifications occurring in the last minute are hidden, and so on.

Based on the information made available to it in queue 239, notification service 233 determines whether or not multiple notifications are present in the queue 239 (step 305). If multiple notifications are present, then notification service 233 sends a group notification (Step 239). This may occur in place of any individual notifications, although optionally an individual notification could be sent in addition to a group notification (step 311). If only a single notification is present in the queue, then a single, individual notification is communicated externally to users (step 307).

The process returns to step 303, to be repeated periodically. The period at which notification process 300 repeats may also be adjusted depending upon conditions, constraints, and goals.

For example, extending the period (and thus reducing the frequency) of notification process 300 would increase the likelihood that multiple notifications are present in the queue. As a result, greater notification efficiencies would be gained, as more internal notifications could be communicated in group notifications. However, extending the period would also increase the delay between the occurrence of an editing event and when end-users are ultimately notified of the event.

Reducing the period (and thus increasing the frequency) of notification process 300 would decrease the likelihood that multiple notifications are present in the queue. This would lead to a relative reduction in notification efficiency, as more internal notifications would result in individual notifications, as opposed to group notifications. However, reducing the period would also reduce the delay between the occurrence of an editing event and when end-users are ultimately notified of the event.

Thus, a balance may be sought by algorithmic or machine learning means, or possibly by manual observations, between the appropriate amount of delay to build-in to queue 239 and the appropriate frequency of notification process 300. The balancing being sought would be one between providing timely notifications to end-users and providing so many notifications that they become counterproductive. Either parameter may be adjusted dynamically. Telemetry signals can be gathered to evaluate their effectiveness and possibly integrated into notification process 300 to automatically optimize operations.

Figure 4:
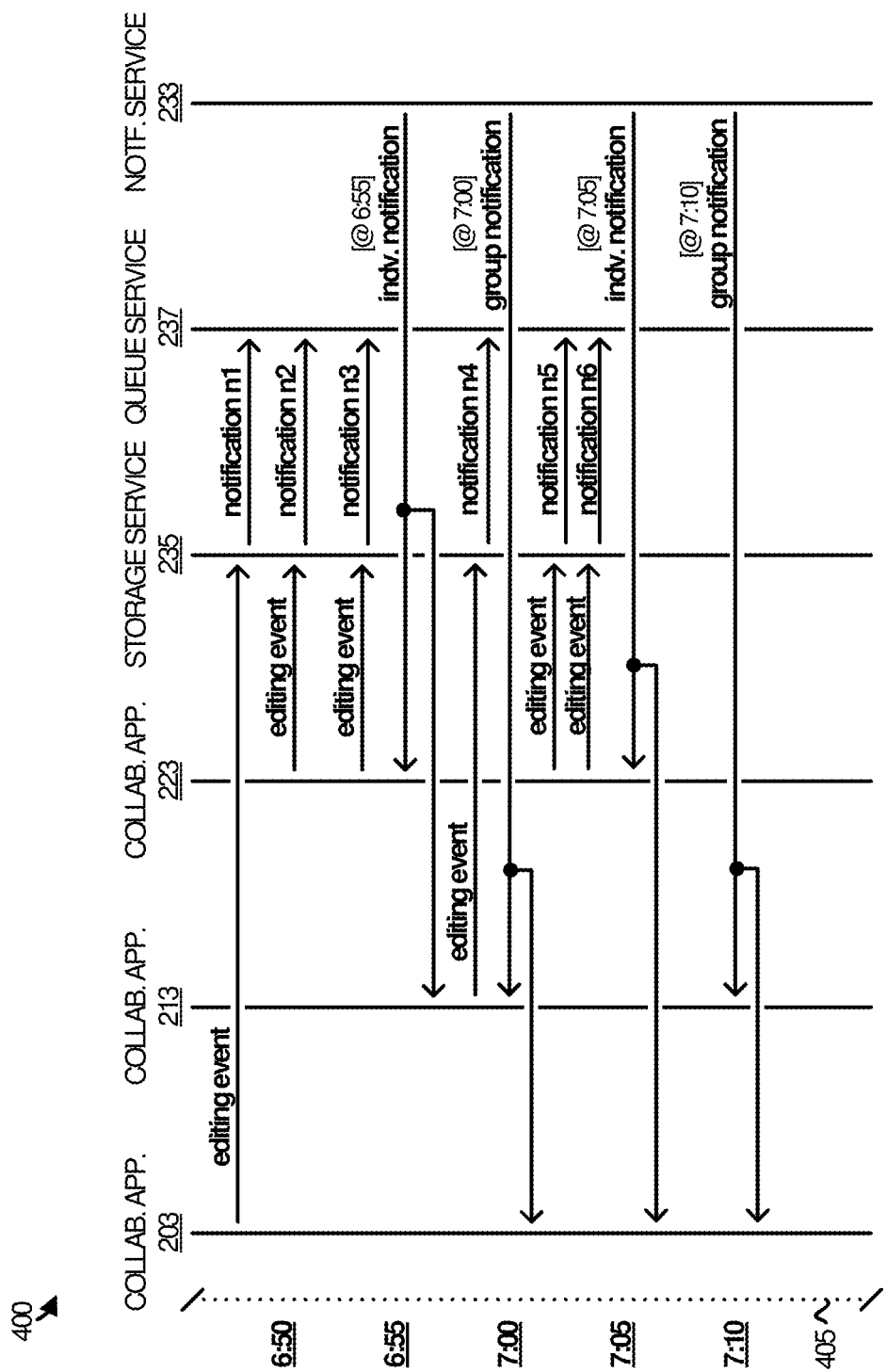
FIG. 4 illustrates an operational sequence in an implementation.
Figure 5:
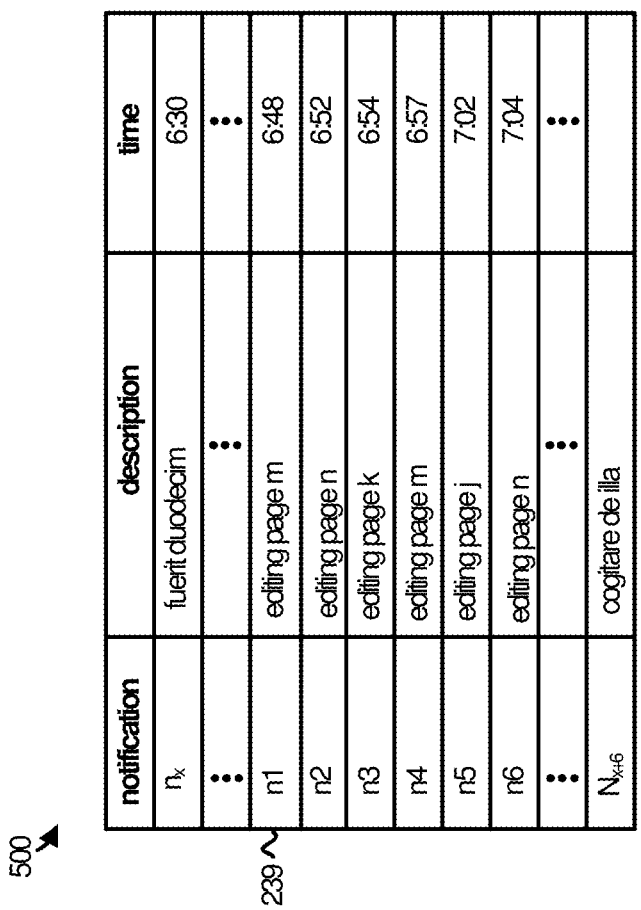
FIG. 5 illustrates a view of a notification queue in an implementation.

FIG. 4 illustrates operational sequence 400 in one implementation of enhanced notification technology that corresponds to the technique illustrated in FIG. 1A. FIG. 5 illustrates one view 500 of queue 239 as it is populated during operational sequence 400.

In operational sequence 400, a user engages with document 206 via user interface 205 in collaboration application 203. The user may initiate an editing event, such as by adding or deleting text (or any other editing event), which is communicated to storage service 235 to be persisted in document 236. At time 6:48, storage service 235 kicks-off an internal notification n1 in response to the editing event. The internal notification is communicated to queue service 237 and is stored in queue 239.

Another editing event occurs with respect to document 226, which causes collaboration application 223 to communicate the editing event to storage service 235. Storage service 235 persists the edit and communicates an internal notification n2 to queue service 237 at time 6:52. Then one more editing event n3 occurs, which results in internal notification n3 at time 6:54.

At time 6:55, notification service 233 examines queue 239 to determine whether or not multiple internal notifications are present/pending. It is assumed for exemplary purposes that a five minute delay is in place in queue 239. As such, notification service 233 sees only notification n1. Accordingly, notification service 233 generates and communicates an individual notification to at least collaboration application 213 and collaboration application 223 to be surfaced in user interface 215 and user interface 225 respectively.

Next, an editing event occurs that is communicated by collaboration application 213 to storage service 235 to be persisted in document 236. Storage service 235 responsively communicates internal notification n4 to queue service 237 at time 6:57.

At time 7:00, notification service 233 examines queue 239 and sees multiple notifications pending in the queue (n2 and n3). Accordingly, notification service 233 generates a group communication to be sent to at least collaboration applications 203 and 213 for surfacing in their user interfaces 205 and 215 respectively.

Two more editing events follow from collaboration application 223 which are logged as internal notification n5 and internal notification n6 in queue 239.

At 7:05, notification service 233 again examines queue 239 and sees only a single notification, n4, present or pending in the queue. Notification service 233 responsively sends an individual notification to at least collaboration applications 223 and 203. At 7:10, notification service 233 examines queue 239 and finds two pending notifications present in the queue, n5 and n6. The presence of multiple notifications keys notification service 233 to communicate a group notification to at least collaboration applications 203 and 213.

As mentioned above, FIG. 5 illustrates a view 500 of queue 239. View 500 may be considered a complete view, in that it describes all of the notifications that occurred through the course of operational sequence 400. FIGS. 6-9 illustrate various additional views of the queue 239 as operational sequence 400 progressed.

For example, FIG. 6 illustrates a view 600 of queue 239 at time 6:55 when notification service 233 first examined the queue. With a delay of five minutes, only those notifications pending the queue prior to 6:50 were visible to or otherwise made available to notification service 233, which in this case was notification n1. Thus, notification service 233 sent an individual external notification.

FIG. 7 illustrates a view 700 of queue 239 at time 7:00 when notification service 233 next examined the queue. Notification n2 and n3 were made visible to notification service 233, which resulted in the group notification.

FIG. 8 illustrates a view 800 of queue 239 at time 7:05 when notification service 233 again examined the queue. Notification n4 was made visible to notification service 233, which communicated an individual notification accordingly.

Finally, FIG. 9 illustrates a view 900 of queue 239 at time 7:10 when notification 233 last examined the queue in operational sequence 400. Notifications n5 and n6 were made visible to notification service 233 and, as such, it generated and communicated a group message to the end-users.

Figure 10A:
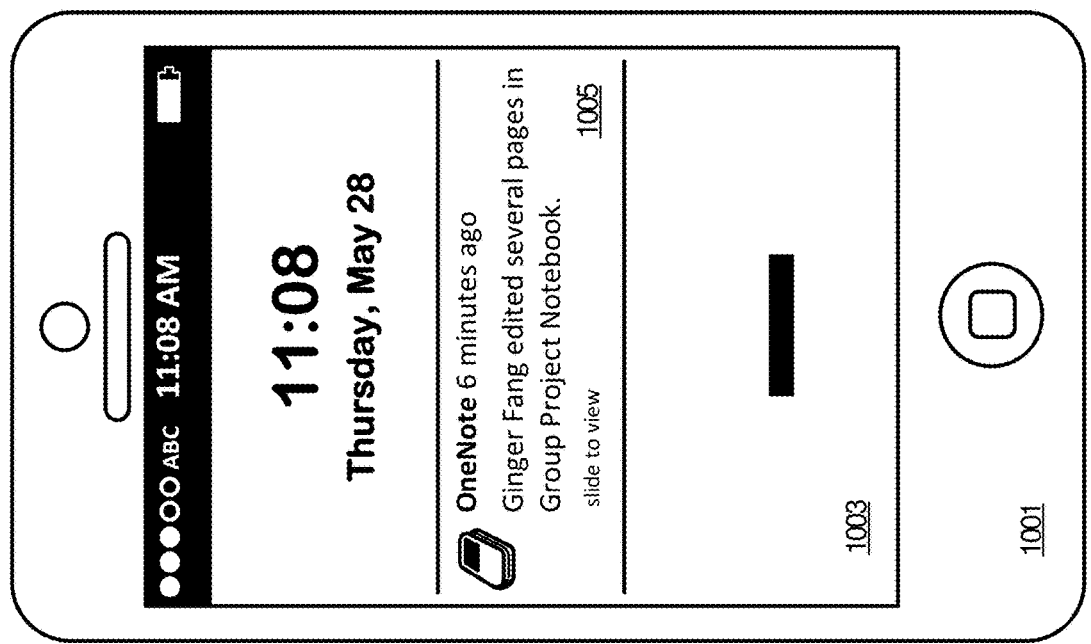

FIGS. 10A-10D illustrate a progression of views that may be experienced by a user in the context of enhanced collaboration notification. FIG. 10A illustrates a computing device 1001, such as a mobile phone, tablet, or any other type of device capable of executing a collaborative editing application. Computing device 1001 includes a lock screen 1003 in which a group notification 1005 may be displayed. Group notification 1005 is representative of a group notification that may be sent by a notification service when multiple internal notifications are present in a queue.

Figure 10B:
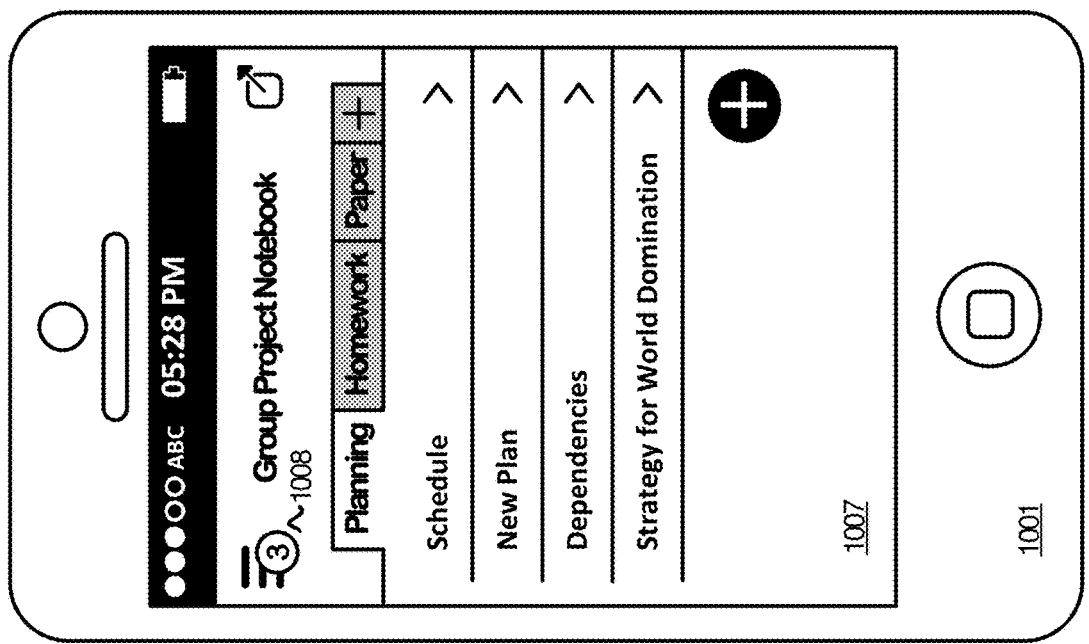

In FIG. 10B, the user may progress to application screen 1007 associated with the collaborative editing application that surfaced group notification 1005 in Figure 10A. Application screen 1007 includes a graphic 1008 that indicates a quantity of notifications that may be pending in a notification center of the application.

Application screen 1009 in FIG. 10C provides another menu via which the user may navigate to a notification center. Another graphic 1010 is present that indicates a quantity of notifications that may be pending in a notification center.

Figure 10D:
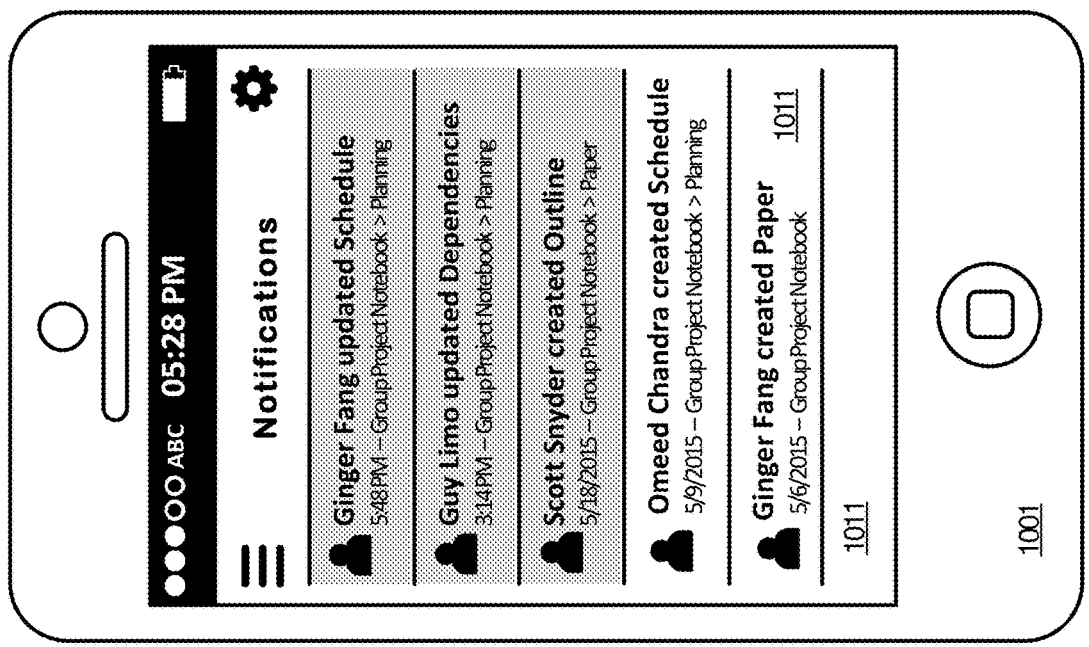

FIG. 10D illustrates an application screen 1011 in which a notification center is displayed. The notification center includes various individual notifications, of which notification 1011 is representative.

The enhanced collaboration technology disclosed herein may be useful in a variety of settings and situations. For instance, when multiple users collaborate, it can be helpful for those users to receive notifications of changes made by the other people they are collaborating with. For example, a student who is jointly writing a paper with a classmate may wish to be notified when her classmate finishes writing his part of the paper in order to unblock her from writing her part. As another example, a couple who maintain a shared grocery list may wish to be notified when their significant other adds a new item to the grocery list. It is generally desirable for these notifications to be delivered in a timely fashion; after all, it's not very helpful to be notified when one's significant other wants you to purchase milk at the grocery store if that notification arrives after you've already left the store. However, when many changes are made in a short period of time, sending a notification for each change can quickly overwhelm and annoy a user, in addition to consuming more network bandwidth and device processing power.

For instance, if one's significant other adds five different items to a grocery list in the space of one minute, the user probably does not want to receive five separate notifications of those changes. A poor experience such as this may lead users to disable or ignore notifications.

The technology disclosed herein seeks to solve this problem by thoughtfully grouping and throttling notifications based on factors such as the temporal proximity of the changes, the specific users who made the changes, and the file(s) affected by those changes. In so doing, users can be notified of important changes in a timely and relevant fashion without overwhelming and annoying them.

Aspects to consider when grouping throttling notifications includes avoiding spamming users with constant notifications during extended editing sessions. For example, if one user is working on the same page for forty-five minutes, other users probably do not want their phones to keep buzzing every few minutes as the user edits that page.

Accordingly, users are given enough time to finish small changes—or at least make meaningful progress if they're making larger changes—before notifying others that the editing has occurred. For instance, if a user starts working on the outline for a group paper and others are notified immediately, it is likely that the user will not have made any progress worth looking at by the time others act on the notification. Thus, the user is given a few minutes to make tangible progress before sending the notification, so that the other users will have something worth reading when they arrive at the page.

However, notifications should also be sent quickly enough to make them timely and relevant. Delaying notifications too long risks that they arrive too late to be useful. Striking a balance between these two concerns is important.

FIG. 11 illustrates computing system 1101 that is representative of any system or collection of systems in which the various operational architectures, scenarios, and processes disclosed herein may be implemented. Examples of computing system 1101 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual machines, smart televisions, smart watches and other wearable devices, as well as any variation or combination thereof.

Computing system 1101 may be implemented as a single apparatus, system, or device or may be implemented in a distributed manner as multiple apparatuses, systems, or devices. Computing system 1101 includes, but is not limited to, processing system 1102, storage system 1103, software 1105, communication interface system 1107, and user interface system 1109. Processing system 1102 is operatively coupled with storage system 1103, communication interface system 1107, and user interface system 1109.

Processing system 1102 loads and executes software 1105 from storage system 1103. Software 1105 includes notification process 1106, which is representative of the notification processes discussed with respect to the preceding Figures, including notification process 300.

When executed by processing system 1102 to enhance collaboration notification capabilities, software 1105 directs processing system 1102 to operate as described herein for at least the various processes, operational scenarios, and sequences discussed in the foregoing implementations. Computing system 1101 may optionally include additional devices, features, or functionality not discussed for purposes of brevity.

Referring still to FIG. 11, processing system 1102 may comprise a micro-processor and other circuitry that retrieves and executes software 1105 from storage system 1103. Processing system 1102 may be implemented within a single processing device, but may also be distributed across multiple processing devices or sub-systems that cooperate in executing program instructions. Examples of processing system 1102 include general purpose central processing units, application specific processors, and logic devices, as well as any other type of processing device, combinations, or variations thereof.

Storage system 1103 may comprise any computer readable storage media readable by processing system 1102 and capable of storing software 1105. Storage system 1103 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1103 may also include computer readable communication media over which at least some of software 1105 may be communicated internally or externally. Storage system 1103 may be implemented as a single storage device, but may also be implemented across multiple storage devices or sub-systems co-located or distributed relative to each other. Storage system 1103 may comprise additional elements, such as a controller, capable of communicating with processing system 1102 or possibly other systems.

Software 1105 may be implemented in program instructions and among other functions may, when executed by processing system 1102, direct processing system 1102 to operate as described with respect to the various operational scenarios, sequences, and processes illustrated herein. For example, software 1105 may include program instructions for implementing enhanced collaboration notification.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1105 may include additional processes, programs, or components, such as operating system software or other application software, in addition to or that include notification process 1106. Software 1105 may also comprise firmware or some other form of machine-readable processing instructions executable by processing system 1102.

In general, software 1105 may, when loaded into processing system 1102 and executed, transform a suitable apparatus, system, or device (of which computing system 1101 is representative) overall from a general-purpose computing system into a special-purpose computing system customized to facilitate enhanced collaboration notification. Indeed, encoding software 1105 on storage system 1103 may transform the physical structure of storage system 1103. The specific transformation of the physical structure may depend on various factors in different implementations of this description. Examples of such factors may include, but are not limited to, the technology used to implement the storage media of storage system 1103 and whether the computer-storage media are characterized as primary or secondary storage, as well as other factors.

For example, if the computer readable storage media are implemented as semiconductor-based memory, software 1105 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1107 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1109 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1109. In some cases, the input and output devices may be combined in a single device, such as a display capable of displaying images and receiving touch gestures. The aforementioned user input and output devices are well known in the art and need not be discussed at length here.

User interface system 1109 may also include associated user interface software executable by processing system 1102 in support of the various user input and output devices discussed above. Separately or in conjunction with each other and other hardware and software elements, the user interface software and user interface devices may support a graphical user interface, a natural user interface, or any other type of user interface.

Communication between computing system 1101 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

EXAMPLE 1

A computing apparatus comprising: one or more computer readable storage media; a processing system operatively coupled with the one or more computer readable storage media; and program instructions stored on the one or more computer readable storage media that, when read and executed by the processing system, direct the processing system to at least: maintain a notification queue of internal notifications related to editing events that occur with respect to a shared document associated with a group of users; periodically determine which of the internal notifications qualify at a given time to be communicated externally to the group of users; when multiple ones of the internal notifications qualify at the given time, generate a group notification to be communicated to the group of users; and when only a single one of the internal notifications qualifies at the given time, generate an individual notification to be communicated to the group of users.

EXAMPLE 2

The computing apparatus of Example 1 wherein, to periodically determine which of the internal notifications qualify, the program instructions direct the processing system to select only those of the internal notifications present in the notification queue prior to a delay.

EXAMPLE 3

The computing apparatus of Examples 1-2 wherein the group notification refers in general to multiple editing events associated with the multiple ones of the internal notifications and wherein the individual notification refers with specificity to an individual editing event associated with the single one of the internal notifications.

EXAMPLE 4

The computing apparatus of Examples 1-3 wherein, to refer with specificity to the individual editing event, the individual notification indicates a specific section in the shared document where the individual editing event occurred, and wherein to refer in general to the multiple editing events, the group notification indicates a general location in the shared document in common to at least two of the multiple editing events.

EXAMPLE 5

The computing apparatus of Examples 1-4 wherein the shared document comprises one of a shared notebook, a word processing document, a spreadsheet, and a presentation.

EXAMPLE 6

The computing apparatus of Examples 1-5 wherein the program instructions direct the processing system to communicate the general notification to instances of a collaboration application used by the group of users to edit and consume the shared document, and communicate the individual notification to the instances of the collaboration application.

EXAMPLE 7

The computing apparatus of Examples 1-6 wherein the program instructions direct the processing system to mark the multiple ones of the internal notifications as sent (or remove them from the queue) in conjunction with communicating the group notification and to mark the single one of the internal notifications as sent (or remove them from the queue) in conjunction with communicating the individual notification.

EXAMPLE 8

The computing apparatus of Examples 1-7 wherein the program instructions direct the processing system to generate and communicate multiple individual notifications for each the internal notifications, in addition to generating and communicating the group notification.

EXAMPLE 9

The computing apparatus of Examples 1-8 wherein a storage service produces the internal notifications as the editing events are implemented in the stored service with respect to the shared document.

EXAMPLE 10

The computing apparatus of Examples 1-9 wherein the program instructions direct the processing system to monitor the notification queue for any urgent notifications and generate an urgent individual notification when an urgent notification is present.

EXAMPLE 11

A method for grouping notifications in collaboration environments, the method comprising: maintaining a notification queue of internal notifications related to editing events that occur with respect to a shared document associated with a group of users; periodically determining which of the internal notifications qualify at a given time to be communicated externally to the group of users; when multiple ones of the internal notifications qualify at the given time, generating a group notification to be communicated to the group of users; and when only a single one of the internal notifications qualifies at the given time, generating an individual notification to be communicated to the group of users.

EXAMPLE 12

The method of Example 11 wherein, to periodically determine which of the internal notifications qualify, the program instructions direct the processing system to select only those of the internal notifications present in the notification queue prior to a delay.

EXAMPLE 13

The method of Examples 11-12 wherein the group notification refers in general to multiple editing events associated with the multiple ones of the internal notifications and wherein the individual notification refers with specificity to an individual editing event associated with the single one of the internal notifications.

EXAMPLE 14

The method of Examples 11-13 wherein, to refer with specificity to the individual editing event, the individual notification indicates a specific section in the shared document where the individual editing event occurred, and wherein to refer in general to the multiple editing events, the group notification indicates a general location in the shared document in common to at least two of the multiple editing events.

EXAMPLE 15

The method of Examples 11-14 wherein the shared document comprises one of a shared notebook, a word processing document, a spreadsheet, and a presentation.

EXAMPLE 16

The method of Examples 11-15 wherein the program instructions direct the processing system to communicate the general notification to instances of a collaboration application used by the group of users to edit and consume the shared document, and communicate the individual notification to the instances of the collaboration application.

EXAMPLE 17

The method of Examples 11-16 wherein the program instructions direct the processing system to mark the multiple ones of the internal notifications as sent in conjunction with communicating the group notification and to mark the single one of the internal notifications as sent in conjunction with communicating the individual notification.

EXAMPLE 18

The method of Examples 11-17 wherein the program instructions direct the processing system to generate and communicate multiple individual notifications for each the internal notifications, in addition to generating and communicating the group notification.

EXAMPLE 19

The method of Examples 11-18 wherein a storage service produces the internal notifications as the editing events are implemented in the stored service with respect to the shared document.

EXAMPLE 20

The method of Examples 11-19 wherein the program instructions direct the processing system to monitor the notification queue for any urgent notifications and generate an urgent individual notification when an urgent notification is present.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   one or more non-transitory computer readable storage devices;
   a processing system operatively coupled with the one or more non-transitory computer readable storage devices; and
   program instructions stored on the one or more non-transitory computer readable storage devices that, when read and executed by the processing system, direct the processing system to at least:
   set a delay in a notification queue of internal notifications related to editing events that occur with respect to a shared document associated with a group of users;
   make visible any internal notifications received prior to the delay and hide those of the internal notifications received during the delay;
   determine which of the internal notifications qualify at a given time to be communicated externally to the group of users, wherein only the internal notifications that are visible qualify;
   when multiple ones of the internal notifications qualify at the given time, generate a general notification to be communicated to the group of users;
   when only a single one of the internal notifications qualifies at the given time, generate an individual notification to be communicated to the group of users;
   monitor the notification queue for any urgent notifications; and
   generate an urgent individual notification when an urgent notification is present.

2. The computing apparatus of claim 1 wherein the program instructions direct the processing system to receive telemetry signals and determine the delay based on the telemetry signals.

3. The computing apparatus of claim 1 wherein the general notification refers in general to multiple editing events associated with the multiple ones of the internal notifications and wherein the individual notification refers with specificity to an individual editing event associated with the single one of the internal notifications.

4. The computing apparatus of claim 3 wherein, to refer with specificity to the individual editing event, the individual notification indicates a specific section in the shared document where the individual editing event occurred, and wherein to refer in general to the multiple editing events, the general notification indicates a general location in the shared document in common between at least two of the multiple editing events.

5. The computing apparatus of claim 4 wherein the shared document comprises one of a shared notebook, a word processing document, a spreadsheet, and a presentation.

6. The computing apparatus of claim 5 wherein the program instructions direct the processing system to communicate the general notification to instances of a collaboration application used by the group of users to edit and consume the shared document, and communicate the individual notification to the instances of the collaboration application.

7. The computing apparatus of claim 3 wherein the program instructions further direct the processing system to at least:
   mark the multiple ones of the internal notifications as sent in conjunction with communicating the general notification; and
   mark the single one of the internal notifications from the notification queue as sent in conjunction with communicating the individual notification.

8. The computing apparatus of claim 7 wherein the program instructions direct the processing system to generate and communicate multiple individual notifications for each of the internal notifications, in addition to generating and communicating the general notification.

9. The computing apparatus of claim 1 wherein a storage service produces the internal notifications as the editing events are implemented in the stored service with respect to the shared document.

10. A method for grouping notifications in collaboration environments, the method comprising:
    setting a delay in a notification queue of internal notifications related to editing events that occur with respect to a shared document associated with a group of users;
    making visible any internal notifications received prior to the delay and hiding those of the internal notifications received during the delay;
    determining which of the internal notifications qualify at a given time to be communicated externally to the group of users, wherein only the internal notifications that are visible qualify;
    when multiple ones of the internal notifications qualify at the given time, generating a general notification to be communicated to the group of users;
    when only a single one of the internal notifications qualifies at the given time, generating an individual notification to be communicated to the group of users;
    monitoring the notification queue for any urgent notifications; and
    generating an urgent individual notification when an urgent notification is present.

11. The method of claim 10 further comprising receiving telemetry signals and determining the delay based on the telemetry signals.

12. The method of claim 10 wherein the general notification refers in general to multiple editing events associated with the multiple ones of the internal notifications and wherein the individual notification refers with specificity to an individual editing event associated with the single one of the internal notifications.

13. The method of claim 12 wherein, to refer with specificity to the individual editing event, the individual notification indicates a specific section in the shared document where the individual editing event occurred, and wherein to refer in general to the multiple editing events, the general notification indicates a general location in the shared document in common between at least two of the multiple editing events.

14. The method of claim 13 wherein the shared document comprises one of a shared notebook, a word processing document, a spreadsheet, and a presentation.

15. The method of claim 14 wherein the program instructions direct the processing system to communicate the general notification to instances of a collaboration application used by the group of users to edit and consume the shared document, and communicate the individual notification to the instances of the collaboration application.

16. The method of claim 12 wherein the program instructions direct the processing system to mark the multiple ones of the internal notifications as sent in conjunction with communicating the general notification and to mark the single one of the internal notifications as sent in conjunction with communicating the individual notification.

17. The method of claim 16 wherein the program instructions direct the processing system to generate and communicate multiple individual notifications for each of the internal notifications, in addition to generating and communicating the general notification.

18. The method of claim 10 wherein a storage service produces the internal notifications as the editing events are implemented in the stored service with respect to the shared document.

* * * * *